(12) United States Patent
Adams et al.

(10) Patent No.: US 8,752,574 B1
(45) Date of Patent: Jun. 17, 2014

(54) SYSTEM FOR INSTALLING SEALANT IN AN INDUSTRIAL VALVE

(75) Inventors: Henry Adams, Lumberton, TX (US); Rusty Smith, Buna, TX (US); Nicholas Swango, Silsbee, TX (US)

(73) Assignee: Henry Adams, Lumberton, TX (US)

( * ) Notice: Subject to any disclaimer, the term of this patent is extended or adjusted under 35 U.S.C. 154(b) by 206 days.

(21) Appl. No.: 13/551,219

(22) Filed: Jul. 17, 2012

(51) Int. Cl.
*F16K 43/00* (2006.01)
(52) U.S. Cl.
USPC .......................... 137/318; 251/214; 277/511
(58) Field of Classification Search
USPC ........... 137/317, 318, 323; 251/214; 277/510, 277/511, 512, 513
See application file for complete search history.

(56) References Cited

U.S. PATENT DOCUMENTS

| | | | | |
|---|---|---|---|---|
| 4,916,938 | A | * | 4/1990 | Aikin et al. ........................ 73/46 |
| 5,062,439 | A | * | 11/1991 | Butler et al. ............... 137/15.11 |
| RE35,116 | E | * | 12/1995 | Butler et al. ............... 137/15.11 |
| 5,908,044 | A | * | 6/1999 | Kearns et al. .............. 137/15.16 |

* cited by examiner

*Primary Examiner* — John Rivell
*Assistant Examiner* — Reinaldo Sanchez-Medina
(74) *Attorney, Agent, or Firm* — Buskop Law Group, PL; Wendy Buskop

(57) ABSTRACT

A system for installing sealant into a stuffing box of an industrial valve with a first volatile organic compound injection valve providing a seal; a removable plug for sealingly engaging an end of the injection port bore forming an additional seal; a rotatable shut off pin for regulating flow through the injection port bore, a high pressure packing gland with packing gland bore, a threaded packing chamber, a threaded injection valve port, and a rotatable packing gland shut off pin to regulate sealant flowing through the packing gland bore or to stop flow of sealant.

15 Claims, 7 Drawing Sheets

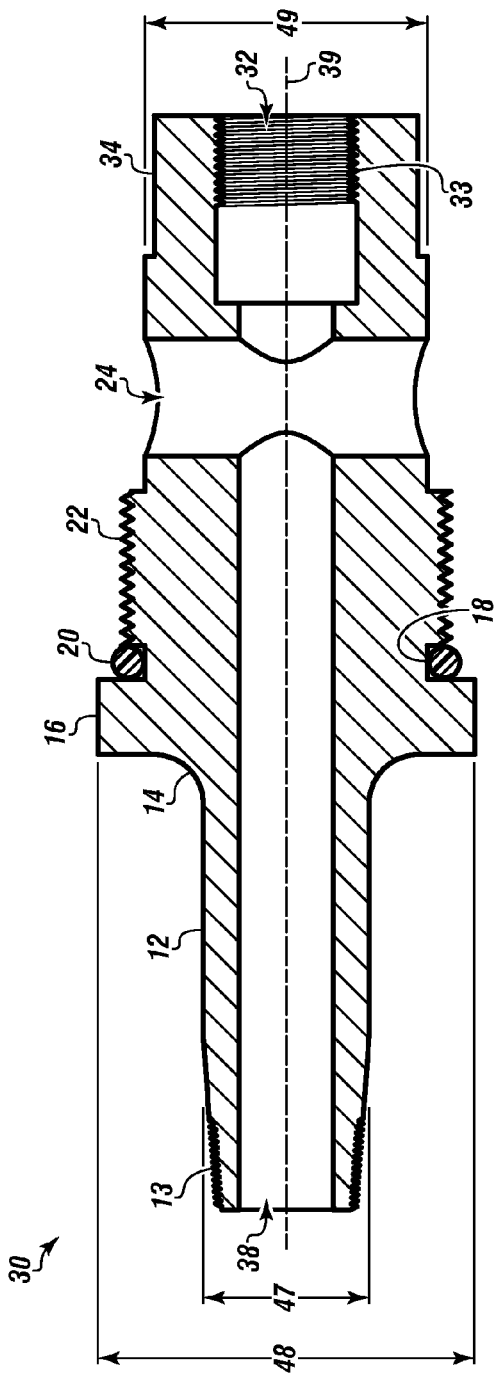
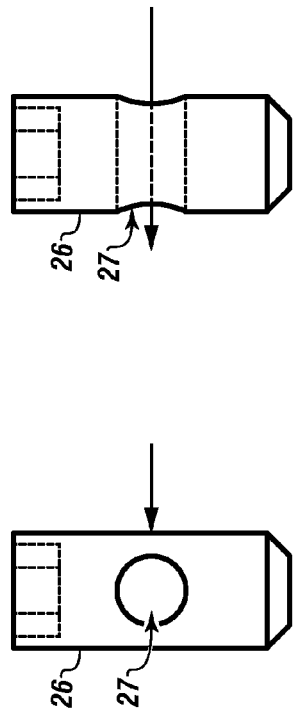
FIGURE 2A
FIGURE 2B
FIGURE 2C

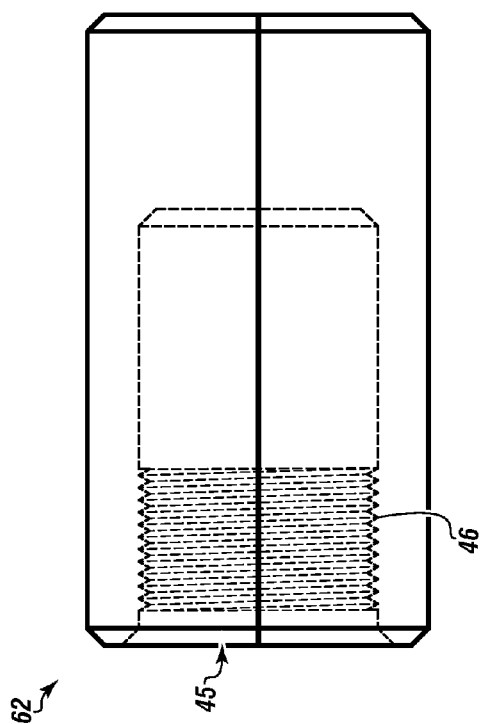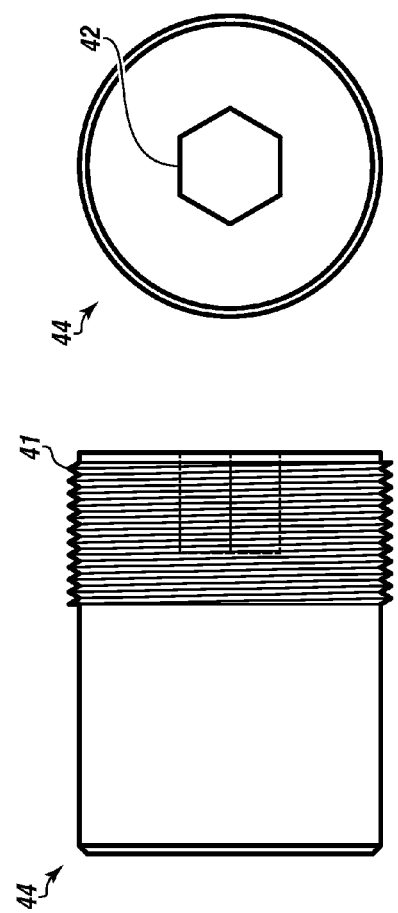

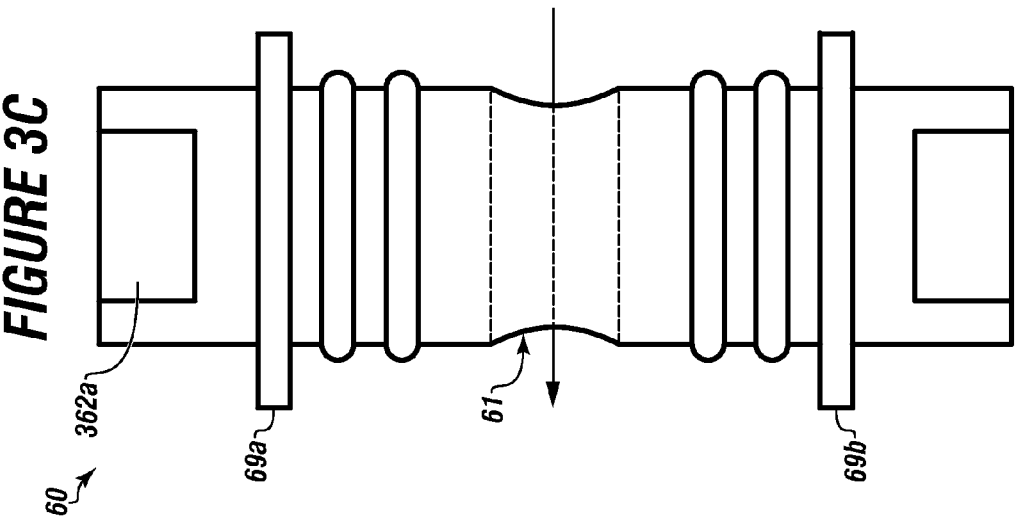
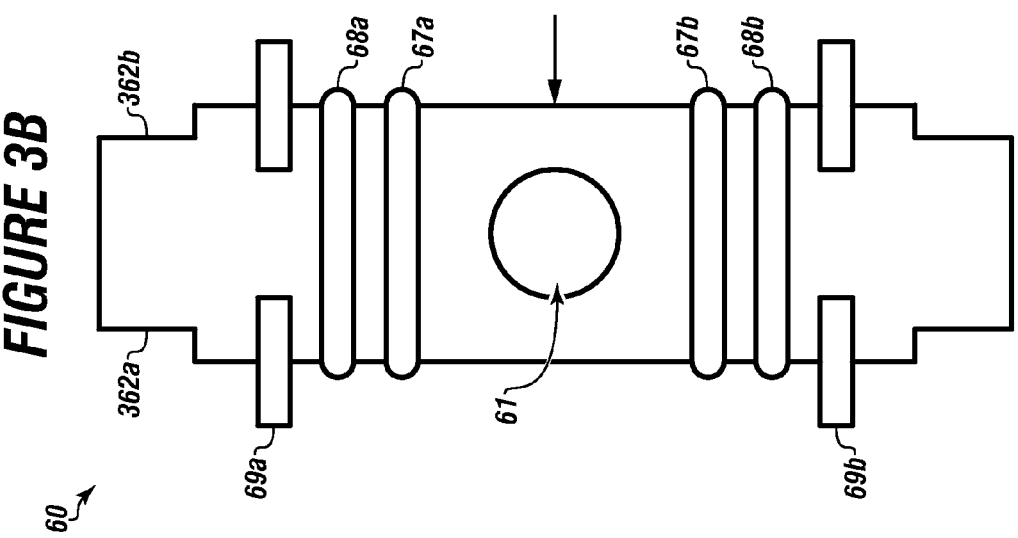

SYSTEM FOR INSTALLING SEALANT IN AN INDUSTRIAL VALVE

FIELD

The present embodiments generally relate to a system for installing high pressure volatile organic compound injection valves in industrial valves for injecting sealant into a stuffing box of the industrial valve.

BACKGROUND

A need exists for a system for adding sealant to a stuffing box of an industrial valve that in part can be pre-installed on the industrial valve and ready for use in a leak proof manner.

A further need exists for sealant injection system that can operate at high pressure for fast, easy injection of graphic stuffing into the stuffing box of the industrial valve.

A need exists for the sealant injection system that can have at least three seals for preventing leaks into or out of the stuffing box of the industrial valve.

A need exists for the sealant injection system that can leave the injection valve safely attached to the stuffing box of the industrial valve with additional sturdy coverings that allow maintenance to be performed and re-performed on the industrial valve stuffing box without concern for leaking of stuffing into the environment during operation or after operational steps have been repeated.

The present embodiments meet these needs.

BRIEF DESCRIPTION OF THE DRAWINGS

The detailed description will be better understood in conjunction with the accompanying drawings as follows:

FIG. 2A depicts a side view of a volatile organic compound injection valve.

FIG. 2B depicts a rotatable shut off pin in a closed position.

FIG. 2C depicts the rotatable shut off pin in an open position.

FIG. 2D depicts a threadable cap.

FIG. 2E depicts a side view of a removable plug.

FIG. 2F depicts a top view of the removable plug.

FIG. 3B depicts a rotatable packing gland shut off pin in a closed position.

FIG. 3C depicts a rotatable packing gland shut off pin in an open position.

FIG. 4A depicts a side view of a rod.

FIG. 4B depicts a side view of a rod with a cutting edge.

Figure 1:
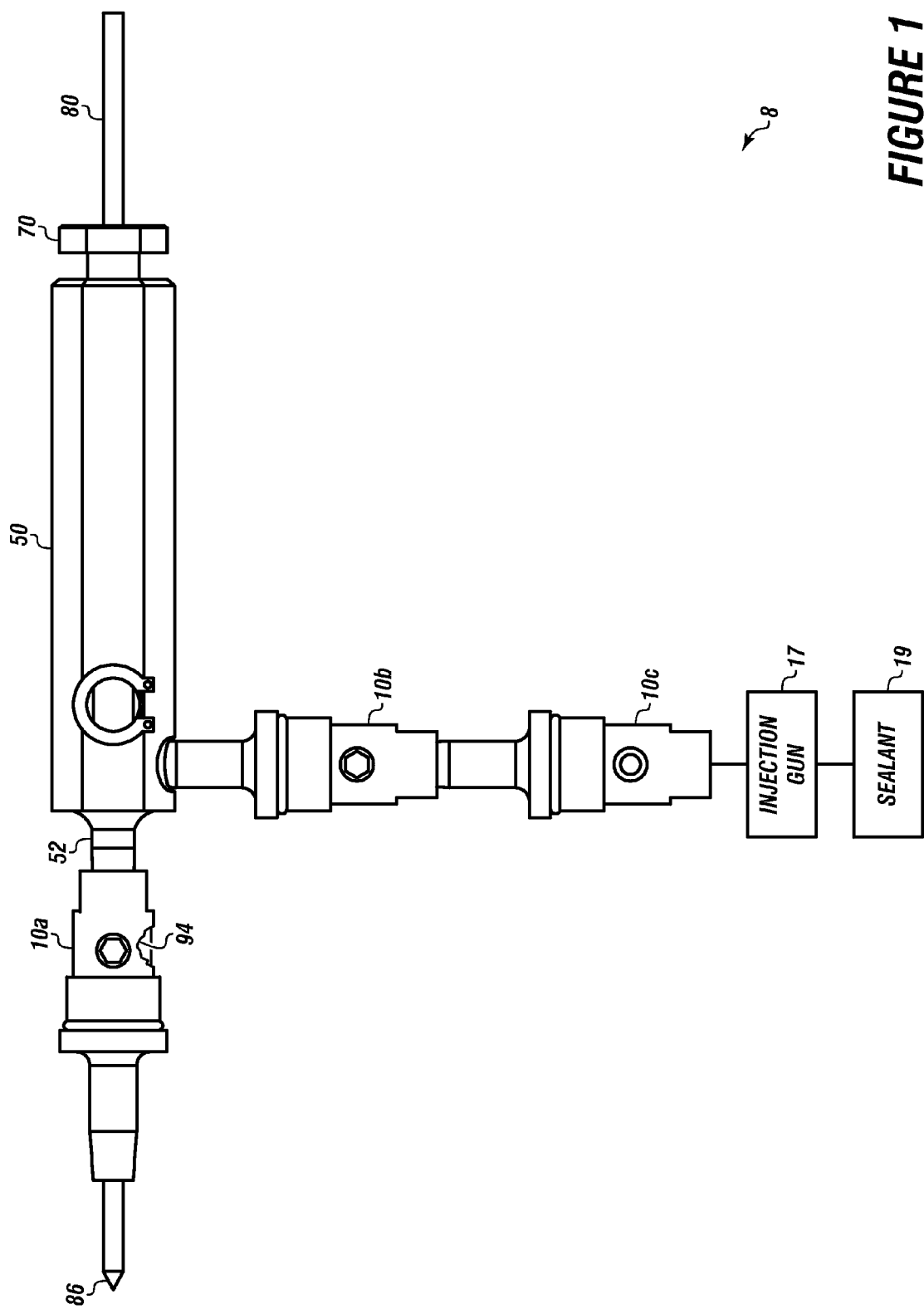
FIG. 1 depicts a schematic of an embodiment of a system for installing sealant in a stuffing box of an industrial valve using a plurality of injection valves with redundant seals.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a system for installing sealant into the stuffing box of an industrial valve. At least a portion of the system can be left in place for additional introduction of sealant into the stuffing box after initial installation.

The sealant can be an injectable sealant packing material. The sealant packing material can be non-curing and have a sealing temperature from about −25 degrees Fahrenheit to about 450 degrees Fahrenheit. The injectable sealant packing material can include polytetrafluoroethylene or fillers suspended in a blended carrier. Illustrative polytetrafluoroethylene can include Teflon™. The blended carrier can be modified organic oil, such as white oil.

The system can include a first volatile organic compound injection valve. The first volatile organic compound injection valve can be located between the stuffing box of an industrial valve and a packing gland. The first volatile organic compound injection valve can be threadably secured to the stuffing box.

The first volatile organic compound injection valve can have one or more sealing means. The sealing means can be any compressible sealing device. Illustrative sealing means can include elastomeric O-rings, copper compressible seals, or the like. At least one of the sealing means can be disposed around the first volatile organic compound injection valve. The sealing means can provide a first seal.

The first volatile organic compound injection valve can have an injector body. A hole can be formed in the injector body. A rotatable shut off pin can be located in the hole.

An injection port bore can be formed through the injector body. The injection port bore can have a cavity located on a portion thereof. For example, the cavity can be located on an end of the injection port bore. The cavity can receive a removable plug. The removable plug can form a second seal with the cavity. The pin can selectively extend into the injection port bore. The pin can be used to regulate flow through the injection port bore.

The removable plug can be removed from the cavity, and a high pressure packing gland can be secured with the cavity. The high pressure packing gland can be screwed into or otherwise secured within the cavity.

The high pressure packing gland can have a packing gland body. The packing gland body can be one piece. The packing gland body can have a packing gland bore formed therethrough. The packing gland bore can extend along a longitudinal axis of the packing gland body. The packing gland body can have a packing gland threaded neck located on one end thereof.

The packing gland bore can have a threaded packing chamber located in a portion thereof. The threaded packing chamber can be formed in a portion of the high pressure packing gland or otherwise located therein.

A threaded injection valve port can be formed through the packing gland body. The threaded injection port can be adjacent to the packing gland threaded neck. The threaded injection valve port can be in fluid communication with the packing gland bore.

The high pressure packing gland can include a rotatable packing gland shut off pin. The rotatable packing gland shut off pin can be positioned to intersect the packing gland bore. The rotatable packing gland shut off pin can be used to regulate sealant flowing through the packing gland bore. The rotatable packing gland shut off pin can be used to stop flow of sealant through the packing gland bore.

A pair of first seals can be used with the packing gland body. One of the first seals of the pair of first seals can be disposed on one side of the rotatable packing gland shut off pin, and another of the first seals of the pair of first seals can be disposed on an opposite side of the rotatable packing gland shut off pin. The pair of first seals can form a secondary seal between the rotatable packing gland shut off pin and the packing gland body. The pair of first seals can include o-rings or other sealing devices.

A pair of second seals can also be used with the packing gland body. One of the second seals of the pair of second seals can be disposed adjacent one of the first seals of the pair of first seals, and another second seal of the pair of second seals can be disposed on the other first seal of the pair of first seals. The pairs of second seals can form a tertiary seal between the rotatable packing gland shut off pin and the packing gland body.

A pair of shut off pin retainers can be used with the packing gland body. One of the shut off pin retainers of the pair of shut off pin retainers can be adjacent to one of the second seals, and another of the shut off pin retainers can be disposed adjacent to the other second seal. The pair of shut off pin retainers can form a fourth seal between the rotatable packing gland shut off pin and the packing gland body.

Packing material can be disposed in the threaded packing chamber.

A compression nut can engage the threaded packing chamber. The compression nut can have a compression nut body integral with a compression nut head. A rod thru bore can be formed in the compression nut, and a compression nut thru bore can be formed in the compression nut. The compression nut thru bore can have a bore diameter larger than a diameter of the rod thru bore.

A rod stop shoulder can be located between the rod thru bore and the compression nut thru bore.

A second volatile organic compound injection valve can be threaded to the packing gland body and attached at a right angle to the packing gland bore at the threaded injection valve port. The second volatile organic compound injection valve can be substantially similar to the first volatile organic compound injection valve. The second volatile organic compound injection valve can be used to introduce sealant into the stuffing box.

A rod with a tapered end and a rod stop can be used to penetrate the compression nut.

The rod stop can have a rod stop diameter larger than the rod diameter. The rod has a tapered end adapted to penetrate the stuffing box. The rod can be used to inject the sealant into the stuffing box.

A first benefit of the system is that it adds enhanced environmental protection.

A second benefit of the system is personnel safety.

A third benefit of the system is that the system can be controlled and monitored by the Environmental Protection Agency (EPA).

A fourth benefit of the system is that the system extends the life of the industrial valve without drastic down time. In addition, the system provides a major cost savings to refining facilities.

Turning now to the Figures, FIG. 1 depicts a schematic of an embodiment of a system for installing sealant in a stuffing box of an industrial valve using a plurality of injection valves with redundant seals.

The system 8 can include a high pressure packing gland 50. The high pressure packing gland 50 can include a packing gland threaded neck 52.

A first volatile organic compound injection valve 10a can be connected with the packing gland threaded neck 52.

A second volatile organic compound injection valve 10b can be connected with the high pressure packing gland 50.

The second volatile organic compound injection valve 10b can be at a right angle to the first volatile organic compound injection valve 10a.

A third volatile organic compound injection valve 10c can be connected with the second volatile organic compound injection valve 10b.

A compression nut 70 can be connected with the high pressure packing gland 50.

A rod 80 can be connected with the compression nut 70. The rod 80 can be used to penetrate a stuffing box of an industrial valve. The rod 80 is shown with a tapered end 86. The rod 80 can have a diameter of about 0.1875 of an inch.

An injection gun 17 can be connected with the third volatile organic compound injection valve 10c. If the third volatile organic compound injection valve 10c is not connected with the second volatile organic compound injection valve 10b, then the injection gun 17 can connect with the second volatile organic compound injection valve 10b.

The injection gun 17 can pump sealant 19 into the system 8. The system 8 can provide the sealant 19 to the stuffing box.

A tungsten carbide coating 94 can be placed over at least a portion of the first volatile organic compound injection valve 10a. The tungsten carbide coating 94 can be placed over the entire outer surface of the first volatile organic compound injection valve 10a.

The tungsten carbide coating 94 can have a thickness from about 100 microns to about 300 microns. The tungsten carbide coating 94 can be disposed uniformly on inner and outer surfaces of the volatile organic compound injection valves 10a, 10b, and 10c, forming hardened high pressure volatile organic compound injection valves.

FIG. 2A depicts a side view of a volatile organic compound injection valves. FIG. 2B depicts a rotatable shut off pin in a closed position. FIG. 2C depicts the rotatable shut off pin in an open position.

Referring to FIGS. 2A, 2B, and 2C the first volatile organic compound injection valve, shown in FIG. 1, has a valve body 30. The valve body 30 can be one piece.

The valve body 30 can have a valve body outer diameter 49. The valve body 30 can have a valve neck 12. The valve neck 12 can have valve neck threads 13. An injection port bore 38 can be formed through the valve body 30. The injection port bore 38 can extend through the valve body 30 along a valve body longitudinal axis 39 thereof.

The valve body 30 can have a tapered shoulder 14 that can be adjacent the valve neck 12. The tapered shoulder 14 can be formed between the valve neck 12 and a seal flange 16.

The seal flange 16 can range in thickness from about 0.125 of an inch to about 0.250 of an inch. The seal flange 16 has a seal flange outer diameter 48. The seal flange outer diameter can be from about 1.00 inch to about 1.50 inches. The seal flange outer diameter 48 can be larger than a valve neck outer diameter 47. The seal flange outer diameter 48 can be from about 50 percent to about 75 percent larger than the valve neck outer diameter 47.

A seal groove 18 can be located adjacent to the seal flange 16. The seal groove 18 can have a seal means 20 located therein. The seal means 20 can be an O-ring.

A pin thru hole 24 can be formed through the valve body 30.

Outer body threads 22 can be formed on the valve body 30 between the pin thru hole 24 and the seal groove 18.

A rotatable shut off pin 26 can be disposed in the pin thru hole 24. The rotatable shut off pin 26 can extend at least partially into the injection port bore 38. The rotatable shut off pin 26 can include a shut off pin bore 27. The rotatable shut off pin 26 can be moved to an open position. In the open position the shut off pin bore 27 can be aligned with the injection port pore 38 to open a flow path through the injection port bore 38. The rotatable shut off pin 26 can also be moved to a closed position. The shut off pin bore 27 can be moved out of alignment with the injection port bore 38, blocking the flow path through the injection port bore 38.

The valve body 30 can have a plug cavity 32. The plug cavity 32 can have plug cavity threads 33 formed therein. A removable plug, shown in FIG. 2E, can be disposed in the plug cavity 32. If the removable plug is not in the plug cavity, the plug cavity can connect with the threaded neck of the high pressure packing gland, as shown in FIG. 1.

At least two tightening flats 34 can be formed on the valve body 30.

FIG. 2D depicts a threadable cap 62 that can be connected with the valve body. The threadable cap 62 can have a cap cavity 45. The cap cavity 45 can have cap threads 46.

FIG. 2E depicts a side view of a removable plug. FIG. 2F depicts a top view of the removable plug.

Referring to FIGS. 2E and 2F, the removable plug 44 can have plug threads 41 and a plug tightening area 42. The plug tightening area 42 can be engaged by a screwdriver, a hex head device, or similar device to tighten the removable plug 44 into the plug cavity of FIG. 2A.

Figure 3A:
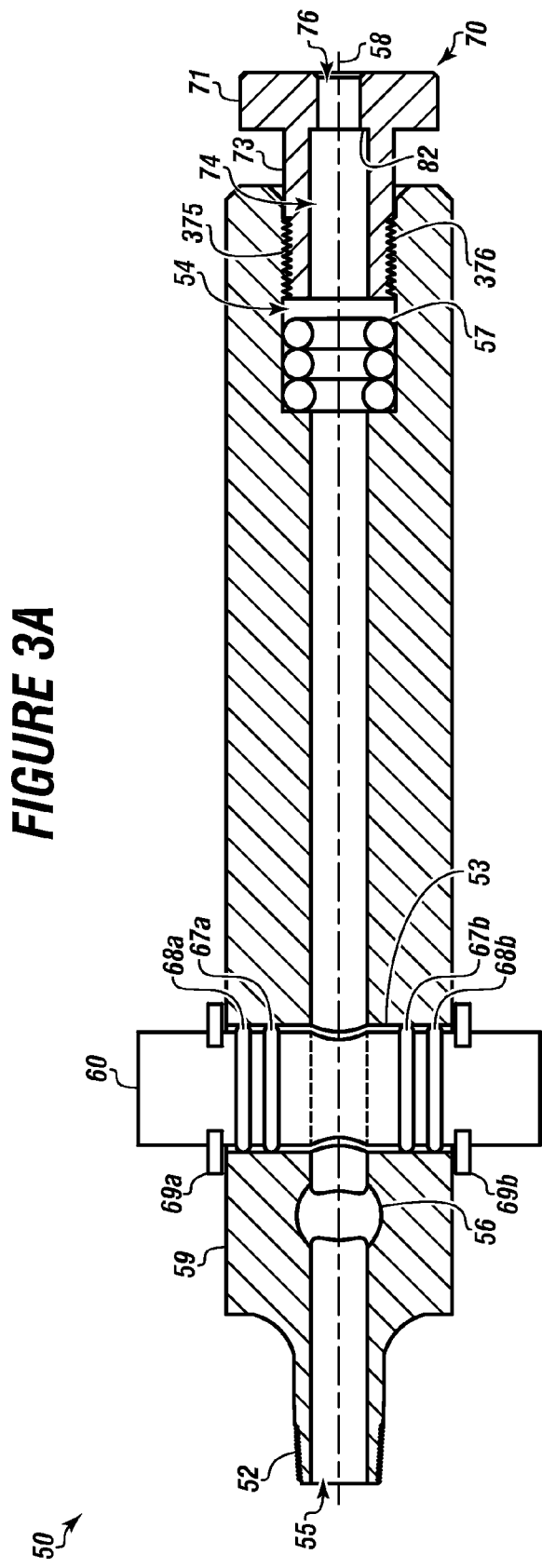
FIG. 3A depicts a cross sectional view of an embodiment of a high pressure packing gland usable with the system.

FIG. 3A depicts a cross sectional view of an embodiment of a high pressure packing gland 50 usable with the system. FIG. 3B depicts a rotatable packing gland shut off pin in a closed position. FIG. 3C depicts rotatable packing gland shut off pin in an open position.

The high pressure packing gland 50 can have a packing gland body 59. The packing gland body 59 can have a packing gland threaded neck 52.

A packing gland bore 55 can be formed through the high pressure packing gland 50. The packing gland bore 55 can be formed along a packing gland longitudinal axis 58. The packing gland longitudinal axis 58 can extend through the high pressure packing gland 50.

A threaded injection valve port 56 can be formed through the packing gland body 59. The threaded injection valve port 56 can be adjacent the packing gland threaded neck 52.

A threaded packing chamber 54 can be located on a portion of the high pressure packing gland 50. The threaded packing chamber 54 can be located on an end portion of the packing gland body 59 opposite the packing gland threaded neck 52.

Packing material 57, such as graphite, can be located in the threaded packing chamber 54.

Compression nut threads 375 can be formed on an inner surface of the threaded packing chamber 54. The compression nut threads 375 can connect to the compression nut 70.

The compression nut 70 can have a compression nut head 71 and a compression nut body 73. The compression nut body 73 can have a diameter smaller than the compression nut head 71. The length of the compression nut 70 can be any size. For example, the length of the compression nut 70 can be from about 1.00 inch to about 1.500 inches.

A compression nut thru bore 74 can be formed through at least a portion of the compression nut 70. For example, the compression nut thru bore 74 can be formed through the compression nut body 73, at least a portion of the compression nut head 71, or combinations thereof. The compression nut thru bore 74 can have a first diameter. The first diameter can be any size. For example, the first diameter can be from about 0.200 of an inch to about 0.375 of an inch.

A rod thru bore 76 can also be formed through at least a portion of the compression nut 70. The rod thru bore 76 can be formed through at least a portion of the compression nut head 71, at least a portion of the compression nut body 73, or combinations thereof. The rod thru bore 76 can have a second diameter. The first diameter of the compression nut thru bore can be smaller than the second diameter. The second diameter can be any size. For example, the second diameter can be from about 0.1875 of an inch to about 0.200 of an inch. The compression nut thru bore 74 can be connected in sequence with the rod thru bore 76 in the compression nut 70.

Compression threads 376 can be formed in the outer surface of the compression nut body 73 for threadably engaging the compression nut threads 375 of the threaded packing chamber 54.

The compression nut 70 can include a rod stop shoulder 82.

A shut off pin hole 53 can be formed through the high pressure packing gland 50. A rotatable packing gland shut off pin 60 can be operatively located within the shut off pin hole 53.

The rotatable packing gland shut off pin 60 can have a first edge 362a and a second edge 362b. The edges 362a and 362b can be configured to allow the rotatable packing gland shut off pin 60 to rotate within the shut off pin hole 53.

The rotatable packing gland shut off pin 60 can have a shut off pin thru bore 61. The shut off pin thru bore 61 can be selectively aligned with the packing gland bore 55 to control flow through the packing gland bore 55. For example, when the rotatable packing gland shut off pin 60 is in an opened position, the shut off pin thru bore 61 can be aligned with the packing gland bore 55, forming a flow path through the entire packing gland bore 55. When the rotatable packing gland shut off pin 60 is in a closed position, the shut off pin thru bore 61 can be moved out of alignment with the packing gland bore 55; blocking flow through the packing gland bore 55.

An upper first seal 67a and a lower first seal 67b can be disposed about the rotatable packing gland shut off pin 60, forming a secondary seal. The first seals 67a and 67b can be O-rings.

An upper second seal 68a and a lower second seal 68b can also be disposed about the rotatable packing gland shut off pin 60, forming a tertiary seal.

An upper shut off pin retainer 69a and a lower shut off pin retainer 69b can be disposed about the rotatable packing gland shut off pin 60, forming a fourth seal.

FIG. 4A depicts a side view of a rod.

The rod 80 has a tapered end 86 for penetrating into a stuffing box.

The rod 80 has a rod body 79. The rod body 79 can have a rod diameter 83. A rod stop 81 can be located on the rod body 79. The rod stop 81 can have a rod stop diameter 85. The rod stop diameter 85 can be larger than the rod diameter 83.

FIG. 4B is a side view of a rod with a cutting edge.

The rod 80 can have cutting edge 92 located between the tapered end 86 and the rod stop 81. The cutting edge 92 can be helical or the like. The cutting edge 92 can be formed on the rod body 79 or otherwise located thereon.

Figure 5:
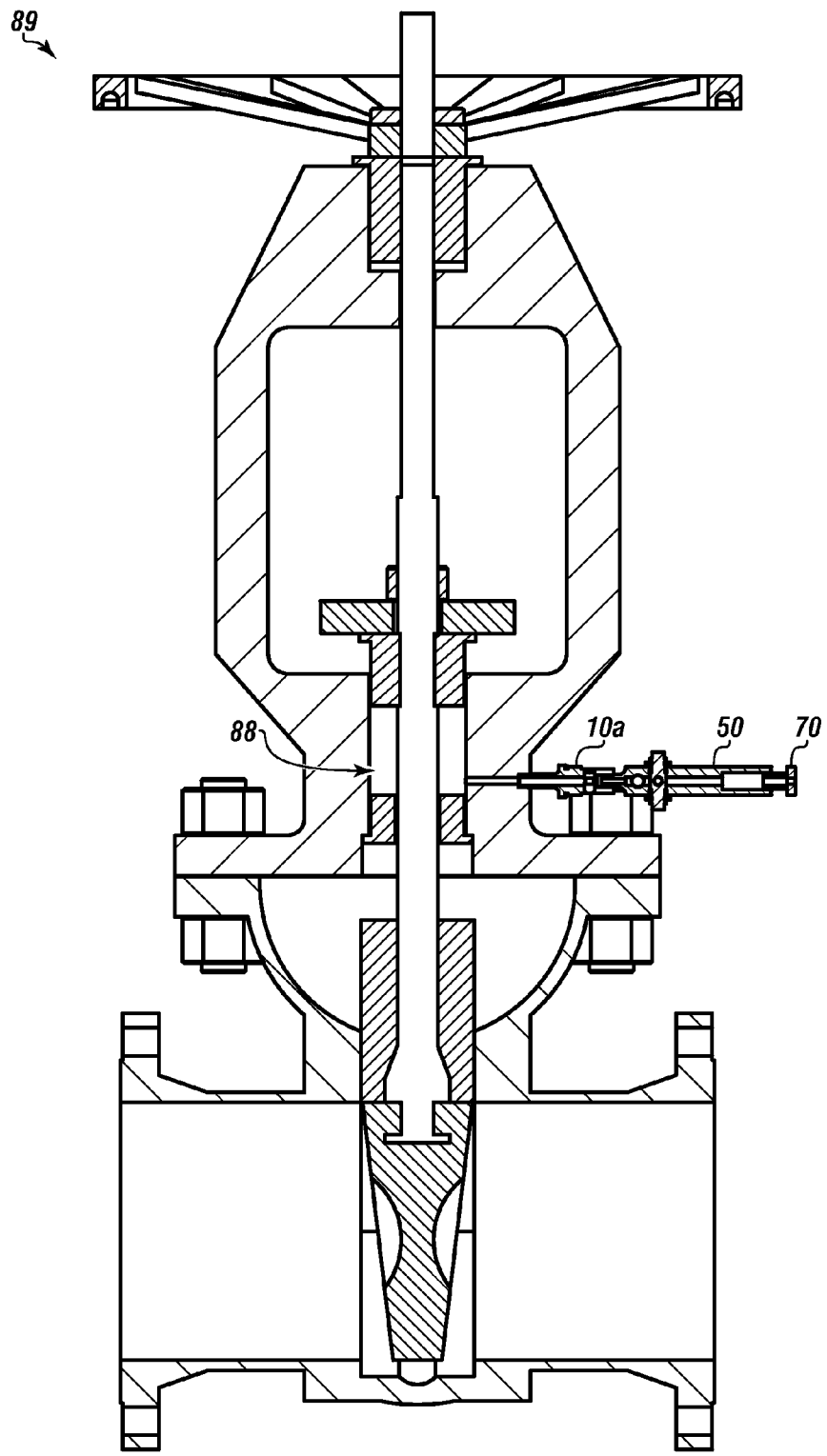
FIG. 5 depicts a schematic of a first volatile organic compound injection valve connected with an industrial valve and a high pressure packing gland.

FIG. 5 depicts a schematic of a first volatile organic compound injection valve 10a connected with an industrial valve 89 and a high pressure packing gland 50.

The industrial valve 89 is depicted with a stuffing box 88. The high pressure packing gland 50 can be connected with the first volatile organic compound injection valve 10a with the compression nut 70 attached to the high pressure packing gland 50.

A thread sealer can be used over the threaded engagements of the volatile organic compound injection valves, high pressure packing gland, and removable plug.

While these embodiments have been described with emphasis on the embodiments, it should be understood that within the scope of the appended claims, the embodiments might be practiced other than as specifically described herein.

What is claimed is:

1. A system for installing a sealant into a stuffing box of an industrial valve, wherein the system comprises:
   a. a first volatile organic compound injection valve for threadably securing to the stuffing box of the industrial valve wherein the first volatile organic compound injection valve has an injection port bore;
   b. a seal means disposed around the first volatile organic compound injection valve;
   c. a removable plug for sealingly engaging one end of the injection port bore;
   d. a rotatable shut off pin in the first volatile organic compound injection valve intersecting the injection port bore for regulating flow through the injection port bore;
   e. a high pressure packing gland in fluid communication with the first volatile organic compound injection valve, wherein the high pressure packing gland comprises:
      i. a packing gland bore along a longitudinal axis of a packing gland body;
      ii. a threaded packing chamber forming a portion of the packing gland bore; and
      iii. a threaded injection valve port is disposed in the packing gland body and in fluid communication with the packing gland bore;
   f. a rotatable packing gland shut off pin positioned to intersect the packing gland bore to regulate the sealant flowing through the packing gland bore or to stop the sealant from flowing through the packing gland bore;
   g. a pair of first seals, wherein one first seal of the pair of first seals is disposed on one side of the rotatable packing gland shut off pin and another first seal of the pair of first seals is disposed on the other side of the rotatable packing gland shut off pin, forming a secondary seal between the rotatable packing gland shut off pin and the packing gland body;
   h. a pair of second seals, wherein one second seal of the pair of second seals is disposed adjacent to one of the first seals of the pair of first seals and another second seal of the pair of second seals is disposed adjacent to the other first seal of the pair of first seals, each forming a tertiary seal between the rotatable packing gland shut off pin and the packing gland body;
   i. a pair of shut off pin retainers with one of the shut off pin retainers disposed on each side of one of the second seals of the pair of second seals forming a fourth seal between the rotatable packing gland shut off pin and the packing gland body; and
   j. packing material disposed in the threaded packing chamber;
   k. a compression nut for rotatably engaging the threaded packing chamber comprising:
      i. a compression nut body integral with a compression nut head;
      ii. a rod thru bore formed in the compression nut body;
      iii. a compression nut thru bore having a bore diameter larger than the rod thru bore diameter; and
      iv. a rod stop shoulder formed between the rod thru bore and the compression nut thru bore;
   l. a second volatile organic compound injection valve threadably secured at a right angle to the packing gland bore at the threaded injection valve port for flowing the sealant into the packing gland bore; and
   m. a rod having a tapered end, a rod diameter and a rod stop, wherein the rod stop has a rod stop diameter, and further wherein the rod stop diameter is larger than the rod diameter, and the tapered end is adapted to penetrate the stuffing box of the industrial valve for injecting the sealant into the stuffing box.

2. The system of claim 1, wherein the first volatile organic compound injection valve comprises:
   a. a valve neck with valve neck threads for engaging the stuffing box of the industrial valve in a sealing engagement, wherein the valve neck has a valve neck outer diameter;
   b. a valve body integral with the valve neck, wherein the valve body has a valve body outer diameter at least 15 percent larger than the valve neck outer diameter, and wherein the valve body has a plug cavity, a pin thru hole, and outer body threads, and further wherein the valve body is one piece;
   c. a seal flange formed between the valve neck and the valve body with a seal flange outer diameter at least 5 percent larger than the valve body outer diameter;
   d. a seal groove formed around the valve body between the seal flange and the outer body threads; and
   e. wherein the seal means is disposed around an outer surface of the valve body and contained within the seal groove.

3. The system of claim 2, wherein the high pressure packing gland comprises:
   a. a packing gland shut off pin hole for containing the rotatable packing gland shut off pin; and
   b. a packing gland threaded neck integral with the packing gland body and extending along the longitudinal axis of the packing gland body away from the threaded packing chamber; and wherein the packing gland threaded neck is adjacent to the threaded injection valve port.

4. The system of claim 3, wherein the rotatable packing gland shut off pin comprises: a shut off pin thru bore, wherein the shut of pin thru bore is selectively positioned to regulate the sealant flowing through the packing gland bore.

5. The system of claim 2, further comprising a threadable cap configured to be disposed about the first volatile organic compound injection valve and contact the seal means in the seal groove creating a compression seal simultaneously with a mechanical seal.

6. The system of claim 2, wherein the plug cavity has plug cavity threads for engaging the removable plug.

7. The system of claim 2, further comprising a first tightening flat and a second tightening flat formed in the valve body on either side of the plug cavity opposite each other.

8. The system of claim 1, wherein the rotatable shut off pin is disposed in a pin thru hole in a valve body, and the rotatable shut off pin further comprises a shut off pin bore for providing a sealable engagement in a first position and a flow path in a second position when the rotatable shut off pin is rotated between the first and second positions.

9. The system of claim 1, wherein the sealant is an injectable sealant packing material that is non-curing, and has a sealing temperature from −25 degrees Fahrenheit to 450 degrees Fahrenheit, and contains polytetrafluoroethylene or fillers suspended in blended carriers.

10. The system of claim 9, wherein the suspended blended carrier is modified organic oil.

11. The system of claim 1, further comprising a third volatile organic compound injection valve is connected in series with the second volatile organic compound injection valve for enhanced shut off control at pressure over 2000 psi.

12. The system of claim 1, further comprising a tungsten carbide coating from 100 microns to 300 microns disposed uniformly on an inner and an outer surface of the first volatile organic compound injection valve forming a hardened high pressure volatile organic compound injection valve.

13. The system of claim 1, wherein the first volatile organic compound injection valve is fluidly connected in parallel and in a leak proof manner with the packing gland body.

14. The system of claim 1, wherein the first volatile organic compound injection valve sustains pressures from 2000 psi to 3000 psi.

15. The system of claim 1, wherein the rod comprises cutting edges adjacent the tapered end.

* * * * *